(12) United States Patent
Nishiie

(10) Patent No.: US 8,957,592 B2
(45) Date of Patent: Feb. 17, 2015

(54) ELECTRICAL POWER CONVERSION DEVICE AND LIGHTING DEVICE

(75) Inventor: Mitsuhiko Nishiie, Yokosuka (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 231 days.

(21) Appl. No.: 13/597,083

(22) Filed: Aug. 28, 2012

(65) Prior Publication Data

US 2013/0162163 A1 Jun. 27, 2013

(30) Foreign Application Priority Data

Dec. 26, 2011 (JP) ................................. 2011-283652

(51) Int. Cl.
*H02M 7/06* (2006.01)
*H05B 37/02* (2006.01)

(52) U.S. Cl.
USPC .......................................... 315/224; 315/291

(58) Field of Classification Search
None
See application file for complete search history.

(56) References Cited

U.S. PATENT DOCUMENTS

| | | | | |
|---|---|---|---|---|
| 6,661,117 | B2* | 12/2003 | Tamai et al. | 307/10.8 |
| 6,972,970 | B2* | 12/2005 | Yamada | 363/21.16 |
| 7,190,151 | B2* | 3/2007 | Ribarich et al. | 323/259 |
| 7,285,873 | B2* | 10/2007 | Brault | 307/19 |
| 7,358,681 | B2* | 4/2008 | Robinson et al. | 315/224 |
| 7,459,864 | B2* | 12/2008 | Lys | 315/291 |
| 7,541,785 | B2* | 6/2009 | Murakami | 323/222 |
| 7,626,372 | B2* | 12/2009 | Yang | 323/285 |
| 7,639,520 | B1 | 12/2009 | Zansky et al. | |
| 7,696,698 | B2* | 4/2010 | Ghanem | 315/123 |
| 7,952,294 | B2* | 5/2011 | Shteynberg et al. | 315/224 |
| 8,344,638 | B2* | 1/2013 | Shteynberg et al. | 315/247 |
| 8,488,353 | B2* | 7/2013 | Ribarich | 363/98 |
| 8,502,470 | B2* | 8/2013 | Barnett et al. | 315/297 |
| 8,633,613 | B2* | 1/2014 | Wanner et al. | 307/31 |
| 2001/0043050 | A1* | 11/2001 | Fisher, Jr. | 320/101 |
| 2005/0213352 | A1* | 9/2005 | Lys | 363/17 |
| 2006/0238029 | A1* | 10/2006 | Hoon et al. | 307/39 |
| 2006/0239040 | A1* | 10/2006 | Fukumoto | 363/21.01 |
| 2007/0085489 | A1* | 4/2007 | Robinson et al. | 315/224 |
| 2007/0159421 | A1* | 7/2007 | Peker et al. | 345/82 |
| 2007/0285031 | A1* | 12/2007 | Shteynberg et al. | 315/294 |
| 2008/0258652 | A1* | 10/2008 | Teng | 315/307 |
| 2009/0085501 | A1* | 4/2009 | Cross | 315/307 |

(Continued)

FOREIGN PATENT DOCUMENTS

| | | |
|---|---|---|
| EP | 2 315 497 A1 | 4/2011 |
| JP | 2003-059676 | 2/2003 |
| WO | 2010005291 A1 | 1/2010 |

OTHER PUBLICATIONS

European Search Report dated May 21, 2014 for Application No. 12 18 1900.7.

*Primary Examiner* — Crystal L Hammond
(74) *Attorney, Agent, or Firm* — Patterson & Sheridan, LLP

(57) ABSTRACT

According to one embodiment, a power conversion device includes a DC conversion circuit, an output conversion circuit, and a control circuit. The DC conversion circuit converts an external power supply voltage to a DC voltage. The output conversion circuit includes a switching element which converts a DC voltage which is converted in the DC conversion circuit to an output voltage corresponding to a load, and supplies the output voltage to the load. The control circuit controls an ON time of the switching element to be constant, regardless of a value of the output voltage corresponding to the load, which is output from the output conversion circuit.

11 Claims, 3 Drawing Sheets

(56) References Cited

U.S. PATENT DOCUMENTS

| | | | |
|---|---|---|---|
| 2009/0091304 A1* | 4/2009 | Yang | 323/242 |
| 2009/0108829 A1* | 4/2009 | Ribarich | 323/318 |
| 2009/0251934 A1* | 10/2009 | Shteynberg et al. | 363/81 |
| 2010/0033150 A1 | 2/2010 | Irissou et al. | |
| 2011/0085354 A1* | 4/2011 | Wang et al. | 363/21.02 |
| 2011/0188267 A1* | 8/2011 | Lai et al. | 363/17 |
| 2011/0227497 A1* | 9/2011 | Hu et al. | 315/224 |
| 2011/0260535 A1* | 10/2011 | Wanner et al. | 307/41 |
| 2011/0291585 A1* | 12/2011 | Foo | 315/291 |
| 2012/0188801 A1* | 7/2012 | Lee et al. | 363/21.13 |
| 2012/0212064 A1* | 8/2012 | Spanoche et al. | 307/82 |

* cited by examiner

ELECTRICAL POWER CONVERSION DEVICE AND LIGHTING DEVICE

INCORPORATION BY REFERENCE

The present invention claims priority under 35 U.S.C. §119 to Japanese Patent Application No. 2011-283652 filed on Dec. 26, 2011. The content of the application is incorporated herein by reference in their entirety.

FIELD

Embodiments described herein relate generally to a power conversion device which supplies electrical power to a load, and a lighting device using the power conversion device.

BACKGROUND

In the related art, in a power conversion device which supplies electrical power to, for example, an LED element as a load, an AC power supply voltage is converted to a DC voltage, the DC voltage is converted to a predetermined output voltage by an output conversion circuit having a switching element which turns the DC voltage on and off at constant frequency, supplies the converted output voltage to the LED element, and lights up the LED element.

In such a power conversion device, it is controlled such that an output current which is output to the LED element is detected, an ON time of the switching element of an output conversion circuit is varied according to the detected output current, and the LED element is supplied with a constant output current.

For example, when the power conversion device is used in common by a plurality of types of loads of which the number of LED elements is different, if a load using a certain number of LED elements is set to the reference, the ON time of the switching element is controlled to be short, since it is preferable that the output voltage which is output from the output conversion circuit be small, as the number of LED elements is small. However, since the switching element has a property in which a power loss in the switching element is increased, as the ON time of the switching element becomes short, there is a problem in that power conversion efficiency is decreased.

An object of the embodiments is to provide a power conversion device and a lighting device in which high power conversion efficiency is maintained regardless of a value of an output voltage which is output to a load.

DESCRIPTION OF THE DRAWINGS

FIG. 3(a) is a table, and FIG. 3(b) is a graph.

FIG. 4(a) is a waveform chart which describes an ON time in one cycle of the switching element, and FIG. 4(b) is a waveform chart which describes a change in time in one cycle of the switching element.

FIG. 5(a) is a characteristic diagram which shows the power loss when the load is high, and the ON time of the switching element is long.

FIG. 6(a) is a table, and FIG. 6(b) is a graph, according to a second embodiment.

DETAILED DESCRIPTION

A power conversion device according to embodiments includes a DC conversion circuit, an output conversion circuit, and a control circuit. The DC conversion circuit converts an external power supply voltage to a DC voltage. The output conversion circuit includes a switching element which converts the DC voltage which is converted in the DC conversion circuit to an output voltage corresponding to a load, and supplies the output voltage to the load. The control circuit controls so that an ON time of the switching element becomes constant regardless of a value of the output voltage corresponding to the load, which is output from the output conversion circuit.

With this configuration, it is possible to expect that the switching element can usually perform a switching operation in a state with a few power losses, and high power conversion efficiency is maintained, since the ON time of the switching element is controlled to be constant regardless of the value of the output voltage corresponding to the load, which is output from the output conversion circuit.

Hereinafter, a first embodiment will be described with reference to FIGS. 1 to 5.

Figure 1:
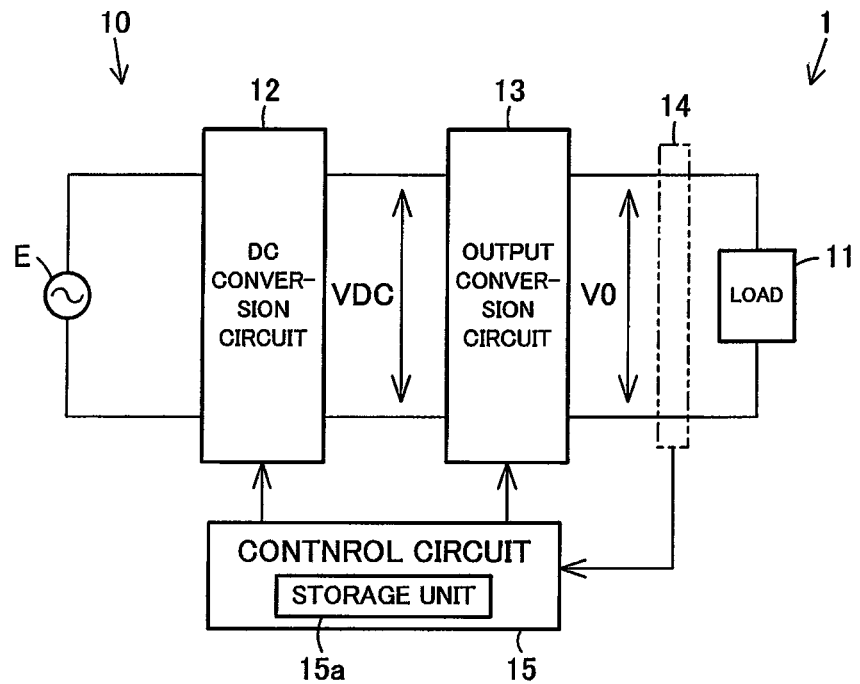
FIG. 1 is a circuit diagram of a power conversion device and a lighting device according to a first embodiment.

As shown in FIG. 1, a power conversion device 10 is a device to which an AC power supply E as an external power supply voltage is input, and supplies the AC power supply to a load 11 by converting the AC power supply to a predetermined output voltage corresponding to the load 11. In addition, the power conversion device 10 is configured as a voltage-free type which corresponds to an input of the AC power supply E in a range of 100 V to 242 V which differs according to an installation environment, or the like.

In addition, the power conversion device 10 supplies a predetermined lighting power to a plurality of LED elements as the load 11 in a lighting device 1 such as, for example, a sign lamp, and is used when lighting the plurality of LED elements up. In a lighting device 1 such as the sign lamp, the number of LED elements used in each type is different, and in many cases, the necessary lighting power is also different, however, the power conversion device 10 is used in common.

In addition, the power conversion device 10 includes a DC conversion circuit 12 which converts the AC power supply E into a DC voltage, and outputs the voltage thereof, an output conversion circuit 13 which converts the DC voltage which is output from the DC conversion circuit 12 to an output voltage corresponding to the load 11, and supplies the voltage thereof to the load 11, a detection unit 14 which detects the output voltage which is output from the output conversion circuit 13, and a control circuit 15 which controls the DC conversion circuit 12, and the output conversion circuit 13 on the basis of a detection result of the output voltage by the detection unit 14.

Figure 2:
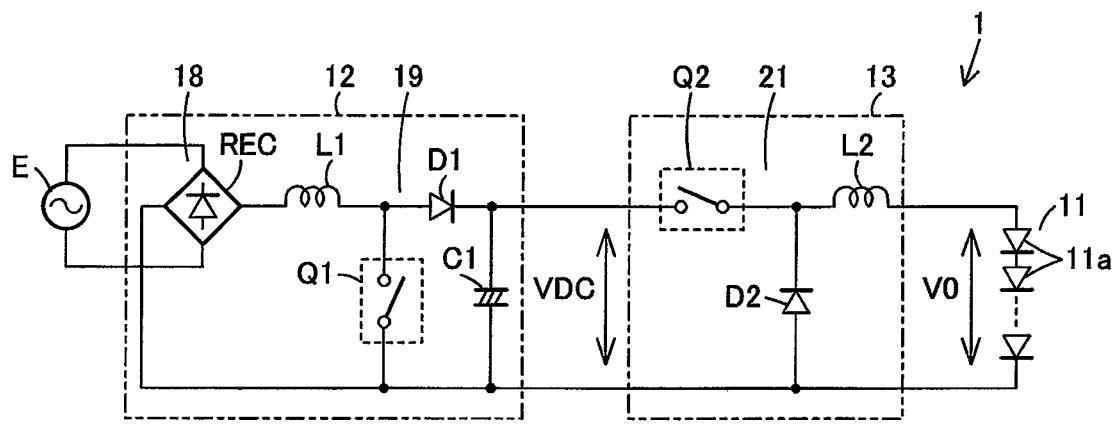
FIG. 2 is a circuit diagram of the power conversion device and the lighting device.

As shown in FIG. 2, the DC conversion circuit 12 includes a rectification circuit 18 which rectifies the AC power supply E, and a boost chopper 19 which boosts a power supply voltage which is rectified, and converts the power supply voltage to a DC voltage.

A full-wave rectifier REC is used in the rectifying circuit 18, an input end of the full-wave rectifier REC is connected to the AC power supply E, and an output end thereof is connected to the boost chopper 19.

The boost chopper 19 includes an inductor L1 which is connected between the output ends of the full-wave rectifier REC, and, for example, a series circuit of a switching element Q1 such as a field effect transistor, an anti-countercurrent diode D1 which is connected in parallel to the switching element Q1, and a series circuit of a smoothing electrolytic capacitor C1. In addition, when the switching element Q1 performs the ON-OFF operation at a predetermined frequency, and the ON time (On duty) by the control of the control circuit 15, a predetermined DC voltage which is boosted at both ends of the electrolytic capacitor C1 is generated. In this manner, the boost chopper 19 boosts the AC power supply E in the range of 100 V to 242 V to a predetermined DC voltage such as, for example, 420 V, and outputs the voltage thereof to the output conversion circuit 13.

The output conversion circuit 13 is configured by a step-down chopper 21, and includes a switching element Q2 such as, for example, the field effect transistor which is connected at both ends of the electrolytic capacitor C1, and a series circuit of a diode D2. An inductor L2 is connected between a cathode of the diode D2 and the load 11. In addition, a predetermined output voltage which is stepped down in order to be supplied to the load 11 is generated when the switching element Q2 performs the ON-OFF operation at a predetermined frequency, and the ON time (On duty) by a control of the control circuit 15.

The load 11 is a plurality of LED elements 11a which is connected in series between the output ends of the output conversion circuit 13.

In addition, as shown in FIG. 1, the control circuit 15 controls the ON time of the switching element Q2 to be constant, regardless of a value of the output voltage which is output from the output conversion circuit 13 according to the load 11.

According to the embodiment, the DC voltage which is output from the DC conversion circuit 12 is variably controlled so that the ON time of the switching element Q2 becomes constant according to the output voltage which is output from the output conversion circuit 13 which is detected by the detection unit 14.

Figure 3:
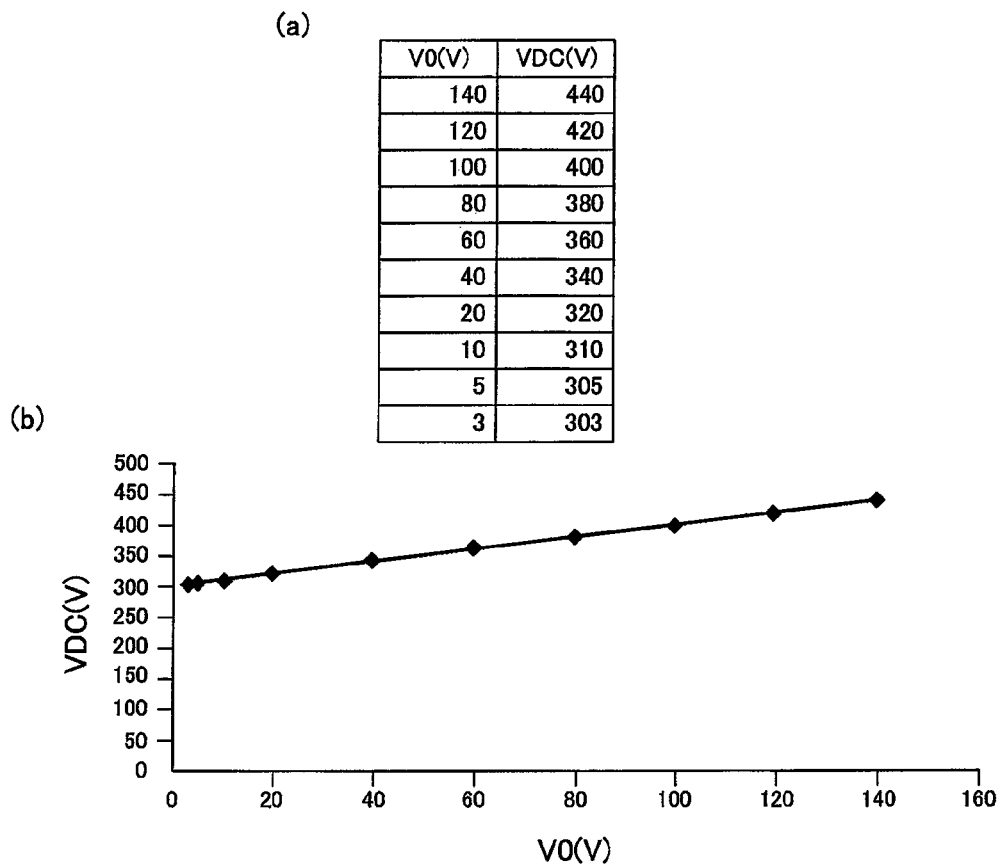
FIGS. 3(a) and 3(b) show a relationship between a DC voltage VDC which is output from a DC conversion circuit of the power conversion device and an output voltage VO which is output from an output conversion circuit.
Figure 4:
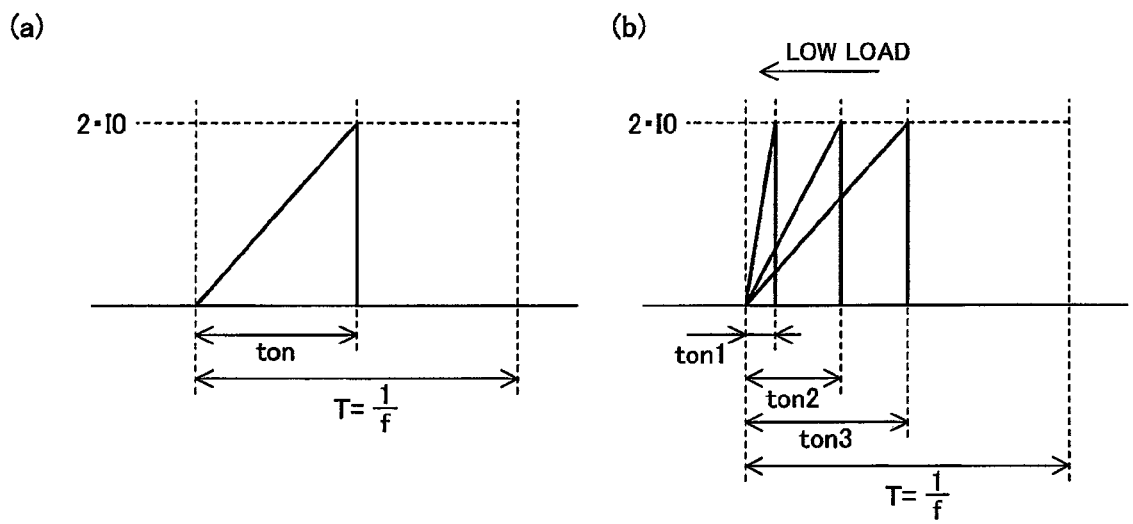
FIGS. 4(a) and 4(b) show an operation of a switching element of the output conversion circuit.
Figure 5:
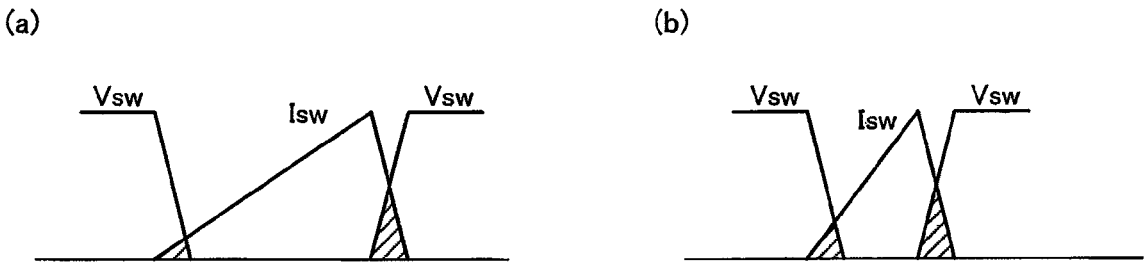
FIGS. 5(a) and (b) show a power loss of the switching element of the output conversion circuit.
FIG. 5(b) is a characteristic diagram which shows the power loss when the load is low, and the ON time of the switching element is short.

Specifically, as shown in FIG. 3, the switching element Q1 of the DC conversion circuit 12 is controlled, and the DC voltage VDC which is output from the DC conversion circuit 12 is changed so that a difference between the DC voltage VDC output from the DC conversion circuit 12 and the output voltage VO output from the output conversion circuit 13 is always constant.

In this manner, it is possible to make the ON time of the switching element Q2 of the output conversion circuit 13 constant even when a value of the output voltage VO which is output from the output conversion circuit 13 is different due to the difference in the number of LED elements 11a, when the DC voltage VDC output from the DC conversion circuit 12 is variably controlled so that a value in which the output voltage VO is subtracted from the DC voltage VDC becomes constant.

Subsequently, an operation of the power conversion device 10 will be described.

When the AC power supply E is input, in the DC conversion circuit 12, the AC power supply E is rectified in the full-wave rectifier REC, the switching element Q1 of the boost chopper 19 performs the ON-OFF operation at the predetermined frequency, and the ON time by the control of the control circuit 15, the power supply voltage which is rectified in the full-wave rectifier REC is chopped, and is boosted to the predetermined DC voltage, thereby outputting the power supply voltage to the output conversion circuit 13.

In the output conversion circuit 13, the switching element Q2 of the step-down chopper 21 performs the ON-OFF operation at the predetermined frequency, and the ON time by the control of the control circuit 15, the DC voltage which is output from the DC conversion circuit 12 is chopped to step down to a predetermined output voltage (DC voltage) for operating the load 11, and outputs the voltage thereof to the load 11. In this manner, the LED elements 11a as the load 11 are lighted up.

The control circuit 15 controls the ON-OFF operations of the switching element Q1 of the DC conversion circuit 12, and the switching element Q2 of the output conversion circuit 13 on the basis of the output voltage which is detected by the detection unit 14, and is output from the output conversion circuit 13.

In addition, as described above, the power conversion device 10 is used in the lighting device 1 such as the sign lamp using the plurality of LED elements 11a as the load 11, and in addition, is used in common in the lighting device 1 of which the number of LED elements 11a is different.

Here, the ON time (ton) in one cycle T in which the switching element Q2 of the output conversion circuit 13 performs the ON-OFF operation is shown in FIG. 4(a). In addition, as shown in FIG. 4(b), when the DC voltage VDC which is output from the DC conversion circuit 12, and a current (2·I0) which flows to the LED elements 11a are constant, respectively, the ON time (ton) in one cycle T of the switching element Q2 can be shorten, for example, from ton 3 to ton 2, and to ton 1 in FIG. 4(b), as the number of LED elements 11a becomes small, and becomes a low load.

FIG. 5(a) shows a power loss of the switching element Q2 when the load 11 is a high load, and the ON time of the switching element Q2 is long, FIG. 5(b) shows a power loss when the load 11 is a low load, and the ON time of the switching element Q2 is short, and shaded portions which are respectively shown denote the power loss. As understood from FIGS. 5(a) and 5(b), areas of the shaded portion increases as the ON time of the switching element Q2 becomes short, the power loss is increased, and the power conversion efficiency is decreased.

When considering such characteristics of the switching element Q2, it is preferable that the ON time of the switching element Q2 be maintained to be constant in a state where the power loss is small, and the power efficiency be maintained to be high, regardless of the value of the output voltage which is output from the output conversion circuit 13 according to the load 11.

According to the embodiment, the DC voltage which is output from the DC conversion circuit 12 is variably controlled by the control circuit 15 so that the ON time of the switching element Q2 becomes constant according to the output voltage which is detected by the detection unit 14, and is output from the output conversion circuit 13.

Specifically, as shown in FIGS. 3(a) and 3(b), it is possible to make the ON time of the switching element Q2 constant so that the switching element Q2 can perform the switching operation in a state with a few power losses at all times, even when the value of the output voltage VO which is output from the output conversion circuit 13 is different due to the difference in the number of LED elements 11a by variably controlling the DC voltage VDC which is output from the DC conversion circuit 12 so that the value in which the output voltage VO is subtracted from the DC voltage VDC becomes constant.

In this case, the value of the output voltage VO and the value of the DC voltage VDC in a load state as the reference are set to the reference value, and the reference value is stored in a storage unit 15a which is provided in the control circuit 15. For example, the output voltage VO of 100 V, and the DC voltage VDC of 400V are set the reference values. In addition, the control circuit 15 compares the output voltage VO which is detected by the detection unit 14 with the reference value, obtains the DC voltage VDC so that the output voltage VO which is subtracted from the DC voltage VDC becomes constant when the value is different, and changes the DC voltage VDC which is output from the DC conversion circuit 12 by controlling the switching element Q1 of the DC conversion circuit 12.

In addition, when the load 11 which is lower than the reference load state, and the power conversion device 10 are combined (when the power conversion device 10 is combined with the lighting device 1 having small number of LED elements 11a), the load 11 becomes the low load, and it is assumed that, for example, the output voltage VO of the output conversion circuit 13 becomes 60 V. In this case, the control circuit 15 controls the DC voltage VDC which is output from the DC conversion circuit 12 to be 360 V, since the output voltage VO which is detected by the detection unit 14, and is output from the output conversion circuit 13 becomes 60 V.

In addition, as shown in FIG. 3(a), the control circuit 15 may control the DC voltage VDC according to the output voltage VO which is detected by the detection unit 14 by referring to the table in the storage unit 15a by making a value of the output voltage VO, and a value of the DC voltage VDC which can make the ON time of the switching element Q2 constant with respect to the output voltage VO correspond to each other, and storing in the table of the storage unit 15a in advance, which is included in the control circuit 15.

In this manner, since the DC voltage which is output from the DC conversion circuit 12 can be variably controlled so that the ON time of the switching element Q2 becomes constant according to the output voltage VO detected by the detection unit 14 by the control circuit 15, it is possible to make the switching element Q2 perform the switching operation in a state with a few power losses at all times, regardless of the value of the output voltage VO corresponding to the load 11, which is output from the output conversion circuit 13, and to maintain the high power conversion efficiency.

In addition, since the control circuit 15 variably controls the DC voltage VDC which is output from the DC conversion circuit 12 so that the difference between the DC voltage VDC which is output from the DC conversion circuit 12 and the output voltage VO which is output from the output conversion circuit 13 becomes constant, it is possible to make the ON time of the switching element Q2 constant, regardless of the value of the output voltage VO corresponding to the load 11, which is output from the output conversion circuit 13.

Figure 6:
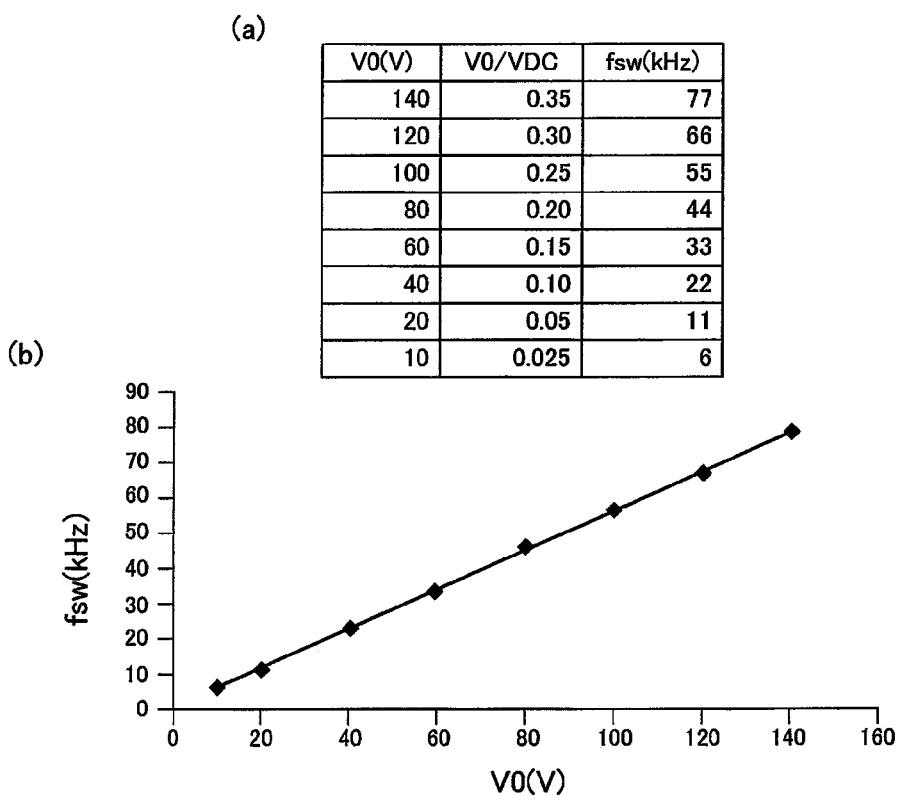
FIGS. 6(a) and 6(b) show a relationship between a DC voltage VDC which is output from a DC conversion circuit of a power conversion device and an output voltage VO which is output from an output conversion circuit.

Subsequently, a second embodiment is shown in FIG. 6. The same configuration as that of the first embodiment will be given with the same reference numerals, and descriptions thereof will be omitted.

In the first embodiment, the DC voltage which is output from the DC conversion circuit 12 is variably controlled by the control circuit 15 so that the ON time of the switching element Q2 becomes constant according to the output voltage which is detected by the detection unit 14, however, instead of it, in the second embodiment, the frequency of the switching element Q2 is controlled so that the ON time of the switching element Q2 becomes constant according to the output voltage which is detected by the detection unit 14.

Specifically, by the control circuit 15, the frequency of the switching element Q2 is variably controlled by comparing the output voltage in the reference load state with the output voltage which is detected by the detection unit 14.

In this case, the output voltage VO in the reference load state, and a value of the frequency f are set to the reference values, and the reference values are stored in the storage unit 15a which is included in the control circuit 15. For example, it is assumed that, in the reference value in the reference load state, the output voltage VO=100 V, the frequency f=55 kHz, and the output voltage VO/DC voltage VDC=0.25. In addition, the control circuit 15 controls a frequency fsw of the switching element Q2 by obtaining a frequency of the switching element Q2 to be variably controlled (target frequency) using an expression of fsw=$\Delta$VO·f when a ratio of the difference between the output voltage in the reference load state and the output voltage which is detected by the detection unit 14 is set to $\Delta$VO, and the frequency of the switching element Q2 in the reference load state is set to f.

In addition, when the load 11 which is lower than the reference load state and the power conversion device 10 are combined (when the power conversion device 10 is combined with the lighting device 1 having small number of LED elements 11a), the load 11 becomes the low load, and, for example, the output voltage VO of the output conversion circuit 13 becomes 60 V. In this case, the control circuit 15 controls the frequency fsw of the switching element Q2 to be 33 kHz, since the output voltage VO which is detected by the detection unit 14 is 60 V, and the $\Delta$VO is 0.6%, accordingly, the frequency fsw=0.6×55=33. In this manner, the ON time of the switching element Q2 becomes the same time as that of the reference load state, and the ON time of the switching element Q2 is constantly maintained, since the frequency fsw of the switching element Q2 becomes smaller than that of the reference load state.

In addition, as shown in FIG. 6(a), the control circuit 15 may determined the frequency fsw according to the output voltage VO which is detected by the detection unit 14 by referring to the table in the storage unit 15a, by making the value of the output voltage VO, and the value of the frequency fsw which is able to set the ON time of the switching element Q2 to be constant with respect to the value of the output voltage VO correspond to each other, and storing the values in advance in the table of the storage unit 15a which is included in the control circuit 15.

In this manner, since the frequency of the switching element Q2 is variably controlled so that the ON time of the switching element Q2 becomes constant according to the output voltage VO which is detected by the detection unit 14 by the control circuit 15, it is possible to make the switching element Q2 perform the switching operation in a state with a few power losses at all times, regardless of the value of the output voltage VO corresponding to the load 11, which is output from the output conversion circuit 13, and to maintain the high power conversion efficiency.

In addition, since the control circuit 15 variably controls the frequency of the switching element Q2 by comparing the output voltage VO as the reference to the output voltage VO which is detected by the detection unit 14, it is possible to make the ON time of the switching element Q2 constant, regardless of the value of the output voltage VO corresponding to the load 11, which is output from the output conversion circuit 13.

According to the power conversion device 10 in each embodiment described above, since the ON time of the switching element Q2 is controlled to be constant regardless of the value of the output voltage VO corresponding to the load 11, which is output from the output conversion circuit 13, it is possible to make the switching element Q2 perform the switching operation in a state with a few power losses at all times, and to maintain the high power conversion efficiency. For this reason, the power conversion device 10 can be used in common with respect to the loads 11 in which the necessary electrical power is different from each other.

In addition, the external power supply voltage is not limited to an AC power supply, and may be a DC power supply. When the external power supply voltage is the DC power supply, the DC conversion circuit 12 converts an input voltage to a DC voltage having a different voltage.

In addition, the load 11 which is supplied with the electrical power from the power conversion device 10 is not limited to the LED element 11a, and may be another light source such as an EL element, or may be electrical equipment other than that.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion device comprising:
a DC conversion circuit configured to convert an external power supply voltage to a DC voltage;
an output conversion circuit including a switching element configured to convert the DC voltage converted by the DC conversion circuit to an output voltage corresponding to a load, and apply the output voltage to the load;
a detection unit configured to detect the output voltage; and
a control circuit configured to control the DC voltage output from the DC conversion circuit based on the output voltage detected by the detection unit, so that an ON time of the switching element is constant, regardless of a value of the output voltage.

2. The device according to claim 1,
wherein the control circuit is configured to control the DC voltage output from the DC conversion circuit so that a difference between the DC voltage output from the DC conversion circuit and the output voltage is constant.

3. The device according to claim 2, further comprising:
a storage unit which stores a reference value of the DC voltage, and a reference value of the output voltage corresponding to a reference load,
wherein the control circuit is configured to obtain the value of the output voltage detected by the detection unit and control the DC voltage output from the DC conversion circuit so that a difference between the value of the output voltage detected by the detection unit and a value of the DC voltage output from the DC conversion circuit becomes the same as a difference between the reference value of the DC voltage and the reference value of the output voltage, which are stored in the storage unit.

4. The device according to claim 2, further comprising:
a storage unit which stores a value of the DC voltage and a value of the output voltage which can make the ON time of the switching element constant with respect to the value of the DC voltage, so that the two values are associated with each other,
wherein the control unit is configured to control the DC voltage output from the DC conversion circuit based on the output voltage detected by the detection unit and with reference to the storage unit.

5. The device according to claim 1,
wherein the load is an LED element.

6. A lighting device comprising:
a light source; and
the power conversion device of claim 1.

7. A power conversion device comprising:
a DC conversion device configured to convert an external power supply voltage to a DC voltage,
an output conversion circuit including a switching element configured to convert the DC voltage converted by the DC conversion circuit to an output voltage corresponding to a load, and apply the output voltage to the load,
a detection unit configured to detect the output voltage; and
a control circuit configured to control a switching frequency of the switching element based on the output voltage so that the ON time of the switching element is constant, regardless of a value of the output voltage.

8. The device according to claim 7,
wherein the control circuit is configured to control the switching frequency of the switching element by comparing a reference output voltage to the output voltage.

9. The device according to claim 8, further comprising:
a storage unit which stores a reference value of the output voltage and a reference value of the switching frequency corresponding to a reference load,
wherein the control circuit is configured to control the switching frequency of the switching element to a target frequency by obtaining a rate of a difference between the output voltage and the reference value of the output voltage with respect to the reference value of the output voltage, and obtaining the target frequency based on the reference value of the switching frequency and the rate.

10. The device according to claim 8, further comprising:
a storage unit which stores a value of the output voltage, and the value of the switching frequency which can make the ON time of the switching element constant with respect to the value of the output voltage so that the two values are associated with each other,
wherein the control circuit is configured to control the switching frequency of the switching element according to the output voltage and with reference to the storage unit.

11. A lighting device comprising:
a light source; and
the power conversion device of claim 7.

* * * * *